3,341,549
2-SULFONYL- AND 2-CYANO-5-NITRO-
IMIDAZOLES
David W. Henry, Menlo Park, Calif., assignor to Merck & Co., Inc., Rahway, N.J., a corporation of New Jersey
No Drawing. Filed July 22, 1966, Ser. No. 567,060
11 Claims. (Cl. 260—309)

This is a continuation-in-part of my application Serial Number 300,675, filed August 7, 1963, now abandoned.

This invention relates generally to now and novel syntheses of 1,2,5-trisubstituted imidazoles. More particularly, it relates to novel methods of making 1-substituted-5-nitroimidazole-2-carboxamides and esters of 1-substituted-5-nitroimidazole-2-carboxylic acid. Still more specifically, it is concerned with the synthesis of such imidazoles from 2-substituted imidazoles. It relates further to novel imidazole compounds obtained as intermediates in such processes.

1-loweralkyl-5-nitroimidazole - 2 - carboxamide, 1-phenyl - 5-nitroimidazole-2-carboxamide, and 1 - (hydroxylower-alkyl)-5-nitroimidazole-2-carboxamide compounds possess a high degree of antihistomonal and antitrichomonal activity. They are thus useful in the treatment and prevention of the poultry disease known as turkey blackhead, and of the human trichomonal affliction $T.\ vaginalis$ vaginitis. Moreover, esters of 1-loweralkyl-5-nitroimidazole-2-carboxylic acid are key intermediates in certain syntheses of the biologically active 1-loweralkyl-5-nitroimidazole-2-carboxamides. These nitroimidazole-2-carboxamides and 2-carboxylates, and certain methods of making them, are not themselves a part of the present invention. They are rather the invention of my colleague Dale R. Hoff which invention is being claimed in a United States patent application, Serial Number 300,629, filed August 7, 1963, now abandoned.

It is an object of the present invention to provide new and novel chemical syntheses of the 1-loweralkyl, 1-phenyl, and 1-hydroxyloweralkyl-5-nitroimidazole-2- carboxamides and 1-loweralkyl-5-nitroimidazole-2-carboxylates referred to above. It is a further object to provide such syntheses in which the desired end products are obtained in good yield and a high degree of purity. A further object is the provision of new 2-sulfonyl and 2-cyano imidazoles which are key intermediates in such chemical syntheses. Other objects of the invention will be clear from the following description.

In accordance with this invention, it has now been found that 1-acyloxyalkyl, 1-phenyl, and 1-loweralkyl-5-nitroimidazole-2-carboxamides and the corresponding 2-carboxylates can be conveniently and readily obtained from 1-acyloxyalkyl, 1-phenyl, and 1-loweralkyl-2-R thio-5-nitroimidazoles by the general process set forth in the following flow diagram.

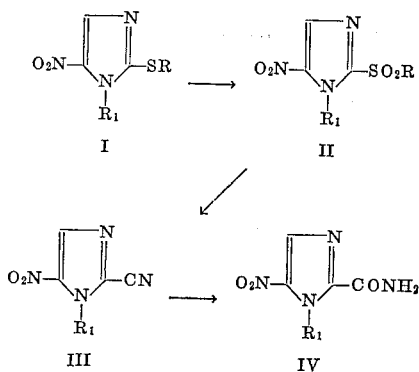

In these formulas, R represents a hydrocarbon radical, and preferably a loweralkyl radical having 1–5 carbon atoms, an aryl or an aralkyl group. Thus, R may be an aliphatic radical such as methyl, ethyl, propyl or butyl, or it may by a cycloaliphatic of the type represented by cyclopentyl. Alternatively, R may be an aryl radical such as the phenyl group, or aralkyl of which the preferred example is benzyl. $R_1$ represents either a loweralkyl radical such as methyl, ethyl, propyl and butyl, a phenyl radical, or a substituted loweralkyl group of the formula $$-(CH_2)_nOX$$

where $n$ is 2, 3 or 4, and X is hydrogen or a lower alkanoyl group such as acetyl, propionyl and the like.

In the first step of this invention, a 1-substituted-2-R thio-5-nitroimidazole of Formula I is converted to the corresponding 1-substituted 2-R sulfonyl-5-nitroimidazole of Formula II by treatment with an oxidizing agent. When a hydroxyloweralkyl group is present at the 1-position, the hydroxy group is protected by conversion to a loweralkanoyloxy substituent prior to the oxidation.

The oxidation reaction is preferably conducted in a mildly acid or a neutral medium. The particular oxidant employed is not unduly critical, and oxidizing systems such as hydrogen peroxide-acetic acid and chlorine in water or aqueous acetic acid are quite satisfactory. Other suitable oxidizing agents are m-chloroperbenzoic acid and other crystalline aromatic per-acids, alkali metal permanganate-aqueous acetic acid, and chromium trioxide-aqueous acetic acid. The reaction takes place rapidly and is normally substantially complete in from ½–2 hours. The desired sulfonyl compounds are quite insoluble in cold water and this property can be used to advantage in the recovery and purification of the materials. Thus, they will precipitate directly from an aqueous reaction medium, or may be extracted into a suitable organic solvent such as chloroform, the solvent removed and the residual sulfonyl compound then further purified by recrystallization from water.

Employing the appropriate starting materials, examples of new sulfonylimidazoles obtained in accord with this invention by oxidation of the corresponding 2-R thio imidazoles are 1-methyl-2-methylsulfonyl-5-nitroimidazole,
1-methyl-2-ethylsulfonyl-5-nitroimidazole,
1-methyl-2-propylsulfonyl-5-nitroimidazole,
1-ethyl-2-methylsulfonyl-5-nitroimidazole,
1-n-propyl-2-benzylsulfonyl-5-nitroimidazole,
1-methyl-2-phenylsulfonyl-5-nitroimidazole,
1-methyl-2-cyclopentylsulfonyl-5-nitroimidazole,
1-(β-acetoxyethyl)-2-methylsulfonyl-5-nitroimidazole,
1-penyl-2-methylsulfonyl-5-nitroimidazole, and
1-(γ-propionoxypropyl)-2-benzylsulfonyl-5-nitroimidazole.

These 1-substituted-2-R sulfonyl-5-nitroimidazoles are important intermediates in preparing 1-substituted 5-nitroimidazole-2-carboxamides and 1-loweralkyl-5-nitroimidazole-2-carboxylates as described below.

In the second step of this novel process, the 1-phenyl, 1-acyloxylalkyl, and 1-loweralkyl-2-R sulfonyl-5-nitroimidazoles of Formula II above are converted to the novel 1-substituted-2-cyano-5-nitroimidazoles of Formula III by reaction with cyanide ion in a polar organic solvent. The process is effectively brought about by intimately contacting the sulfonyl imidazole and cyanide ion in a polar solvent such as dimethyl formamide, dimethylsulfoxide or a lower alkanol. It is a preferred aspect of the process that the reaction medium be essentially anhydrous. For best results, I employ about 5–15% molar excess of cyanide, although this is not necessary, and essentially equimolar quantities of reactants, or even a larger excess of cyanide, may be used if desired. It is convenient and a preferred embodiment of the invention to use an alkali metal cyanide, such as potassium or sodium cyanide as the source of cyanide ion, although other compounds that are soluble in the reaction medium and that provide cyanide ion under the reaction conditions employed are, of course, satisfactory.

The reaction proceeds to completion rapidly at temperatures of from about 50–100° C., and the resulting 1-loweralkyl-2-cyano-5-nitroimidazole, 1-phenyl-2-cyano-5-nitroimidazole, or 1-(acyloxyloweralkyl)-2-cyano-5-nitroimidazole is recovered from the reaction mixture by methods known in the art. It is convenient and highly satisfactory to dilute the reaction mixture with water and extract the 2-cyano imidazole into a water-immiscible organic solvent such as ether from which the imidazole may be readily recovered and purified by recrystallization or chromatography on alumina. If desired, the 2-cyano imidazole may be used in the further steps of the process without being highly purified. In this fashion, 1-substituted-2-cyano-5-nitroimidazoles such as the 1-phenyl, 1-methyl, 1-ethyl, 1-propyl, 1-($\beta$-acetoxyethyl), 1-($\gamma$-acetoxypropyl), and 1-($\beta$-propionoxypropyl) compounds are obtained from the corresponding 1-substituted-2-R sulfonyl-5-nitroimidazoles of Formula II above.

At this stage of the process, the 1-(acyloxyloweralkyl)-2-cyano-5-nitroimidazoles are hydrolyzed with acid to 1-(hydroxyloweralkyl)-2-cyano-5-nitroimidazoles. It is preferred to use an alkanolic hydrohalic acid such as ethanolic hydrochloric acid or hydrobromic acid, although other mineral acids, e.g. sulfuric acid, could be used. The hydrolysis is effected by heating at elevated temperatures for a short time. Reaction temperatures of about 50–100° C. and times of 5–15 minutes are quite satisfactory. It is desirable to avoid excessive reaction time or temperature in order to eliminate any hydrolysis of the cyano radical.

On completion of hydrolysis, the 1-(hydroxyloweralkyl)-2-cyano-5-nitroimidazole may be recovered by extracting it into a water-immiscible organic solvent and subsequent removal of the solvent. In this way, novel 2-cyano imidazoles such as 1-($\beta$-hydroxyethyl)-2-cyano-5-nitroimidazole, 1-($\gamma$-hydroxypropyl)-2-cyano-5-nitroimidazole, and 1-($\beta$-hydroxypropyl)-2-cyano-5-nitroimidazole are obtained from the corresponding 1-(acyloxyloweralkyl) compounds.

The 1-phenyl and the 1-loweralkyl-2-cyano-5-nitroimidazoles are converted to the corresponding 1-phenyl or 1-loweralkyl-5-nitroimidazole-2-carboxamides by contacting them with a base. For this purpose, aqueous solutions of an alkali metal hydroxide such as sodium or potassium hydroxide are preferred. However, bases such as aqueous pyridine or an aqueous picoline could be used satisfactorily. In laboratory experiments a solution of the 2-cyanoimidazole and of the base is stirred at room temperature for from 1–15 minutes, during which time the 1-phenyl or the 1-loweralkyl-5-nitroimidazole-2-carboxamide crystallizes. In larger scale reactions, the reaction times will be somewhat longer and for purely mechanical reasons it may be desirable to avoid or minimize crystallization of the amide until the reaction is substantially complete. It is a preferred aspect of the process to solubilize the 1-loweralkyl-2-cyano-5-nitroimidazole in a suitable water-miscible organic solvent prior to contact with the aqueous base, and for this purpose acetone or methyl ethyl ketone are quite suitable. In this way, 1-phenyl, 1-methyl, 1-ethyl, 1-propyl and 1-butyl-5-nitroimidazole-2-carboxamides are obtained from the corresponding 1-phenyl or the 1-loweralkyl-2-cyano-5-nitroimidazoles.

In accordance with an additional aspect of the invention, the 1-loweralkyl-5-nitroimidazole-2-carboxamides may be obtained directly from the 1-loweralkyl-2-sulfonyl 5-nitroimidazole of Formula II without isolation of a 1-loweralkyl-2-cyano-5-nitroimidazole III. This direct conversion is accomplished by intimately contacting the sulfonyl compound with cyanide ion in an aqueous reaction medium. The source of cyanide ion is not critical, and it is preferred to employ the cyanides and the reaction conditions discussed above in connection with synthesis of the 2-cyanoimidazole.

Conversion of the 1-(hydroxyloweralkyl)-2-cyano-5-nitroimidazoles of Formula III above (where $R_1$ is $-(CH_2)_{2-4}OH$) to the corresponding 1-(hydroxyloweralkyl)-5-nitroimidazole-2-carboxamides is effected via the imino ether and lactone intermediates. This process as applied to synthesis of 1-($\beta$-hydroxyethyl)-5-nitroimidazole-2-carboxamide is represented structurally as:

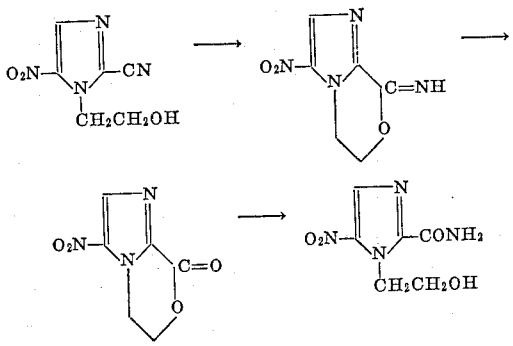

The 1-(hydroxyloweralkyl)-2-cyano-5-nitroimidazole is converted into the iminoether by treatment with a catalytic amount of a strong base, preferably an alkali metal alkoxide such as sodium ethoxide, sodium methoxide, sodium isopropoxide or potassium t-butoxide, in the presence of an alcoholic reaction solvent. The insoluble cyclic iminoether forms very quickly at room temperature and the reaction is usually substantially complete in less than 30 minutes. The reaction mixture may then be acidified directly, without isolation of the cyclic iminoether, this acidification causing transformation of the iminoether to the lactone. For this conversion, it is preferred to use an aqueous mineral acid and desirably a hydrohalic acid. Since the lactone is insoluble in the aqueous acidic reaction mixture, it is readily recovered in highly pure form simply by filtration or centrifugation.

The lactone thus obtained is converted to 1-(hydroxyloweralkyl)-5-nitroimidazole-2-carboxamide by reaction with ammonia in a reaction medium comprising a lower alkanol such as methanol, ethanol or isopropanol. It is preferred to pass an excess of ammonia into a warm alcoholic solution of the lactone. In this way substances such as 1-($\beta$-hydroxyethyl)-5-nitroimidazole-2-carboxamide and 1-($\gamma$-hydroxypropyl)-5-nitroimidazole-2-carboxamide are produced from the corresponding 2-cyano imidazoles.

In addition to serving as an intermediate or precursor for preparation of 1-phenyl or 1-loweralkyl-5-nitroimidazole-2-carboxamides, the 1-phenyl or 1-loweralkyl-2-cyano-5-nitroimidazoles are also useful in making esters of 1-loweralkyl-5-nitroimidazole-2-carboxylic acid, as shown below:

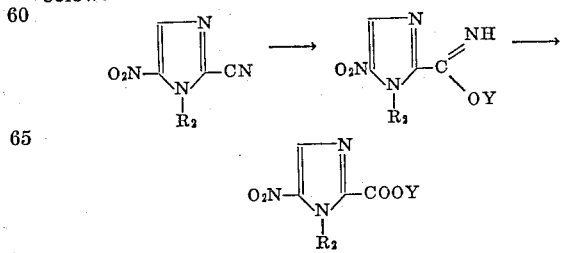

where $R_2$ and Y each represent a loweralkyl radical. $R_2$ and Y, examples of which are methyl, ethyl, propyl, butyl, isobutyl, and the like, may be the same or different in any given compound, and $R_2$ can also be phenyl. The first step of this reaction sequence is conducted by contacting the 2-cyano imidazole with a lower alkanol in the presence of a base, and the loweralkyl radical Y will, of course, correspond to the alkyl group present in the alkanol.

To form the 2-carboximidate shown above, a solution of the 2-cyano imidazole in an anhydrous lower alkanol, such as methanol, ethanol, and isopropanol, is contacted with a catalytic amount of a strong base, and preferably with an alkali or alkaline earth metal alkoxide. Bases such as potassium t-butoxide, sodium isopropoxide, sodium ethoxide and the like are quite satisfactory. Formation of the carboximidate takes place at about room temperature in from about 10 minutes to about 5 hours. At higher temperature, i.e. up to the reflux temperature of the lower alkanol employed, shorter reaction times are suitable. The 1-loweralkyl-5-nitroimidazole-2-carboximidate is quite insoluble in the reaction medium and is normally recovered by precipitation therefrom and filtration.

The 1-phenyl or 1-lower alkyl-5-nitroimidazole-2-carboximidate is then converted to a loweralkyl ester of the 1-phenyl or 1-loweralkyl-5-nitroimidazole-2-carboxylate by treatment with aqueous mineral acid. Dilute mineral acids such as hydrochloric, hydrobromic and sulfuric acid are normally used. Good yields of ester are obtained by allowing an acidified solvent solution of the 2-carboximidate to stand at room temperature for at least 5–10 minutes, although longer reaction times do not have an adverse effect. The resulting esters such as methyl 1-phenyl-5-nitroimidazole-2-carboxylate, methyl 1-methyl-5-nitroimidazole-2-carboxylate, ethyl 1-methyl-5-nitroimidazole-2-carboxylate and propyl 1-ethyl-5-nitroimidazole-2-carboxylate are conveniently recovered in highly pure form by extraction into a water-immiscible organic solvent, e.g. ether, and subsequent removal of the solvent.

These esters are useful in making 1-phenyl or 1-loweralkyl-5-nitroimidazole-2-carboxamides and N-substituted 1-phenyl or 1-loweralkyl-5-nitroimidazole-2-carboxamides, which latter substances have substantial activity against turkey blackhead disease.

Certain of the compounds of this invention, and particularly the 2-R sulfonyl compounds described above, have a significant degree of antibacterial activity. Thus, for instance, compounds such as 1-methyl-2-methylsulfonyl-5-nitroimidazole and 1-($\beta$-acetoxyethyl)-2-methylsulfonyl-5-nitroimidazole have significant activity against *Staphylococci E. coli, Salmonella* and *Streptococci* organisms.

In general, the 1-loweralkyl-2-R thio-5-nitroimidazoles (Formula I above) used as starting materials in the process of this invention have been described in the literature. One convenient way of making them is from 1-loweralkyl-2-mercaptoimidazole or 1-(hydroxyloweralkyl)-2-mercaptoimidazole. The 1-substituted-2-mercaptoimidazole is treated with an alkyl iodide or alkyl sulfate to obtain a 1-substituted-2-alkylthioimidazole, with an aralkyl iodide to form the 2-aralkylthioimidazole, or with diphenyliodonium iodide to produce the 2-phenylthioimidazole. The resulting imidazoles, which have the formula:

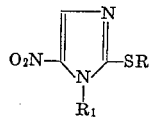

where $R_1$ is loweralkyl or —$(CH_2)_{2-4}OH$, and R is loweralkyl, aryl or aralkyl, are then reacted with nitric acid to produce the corresponding 1-$R_1$-2-SR-5-nitroimidazoles of Formula I hereinabove.

The following examples are given for the purpose of illustration and not by way of limitation.

EXAMPLE 1

*1-methyl-2-methylsulfonyl-5-nitroimidazole*

20.0 g. (0.116 mol) of 1-methyl-2-methylthio-5-nitroimidazole is dissolved in 200 ml. of glacial acetic acid and 35 ml. of 30% hydrogen peroxide is added. The solution is heated on the steam bath for 20 minutes, the heat of reaction causing the mixture to boil gently at 115° C. An additional 18 ml. of 30% hydrogen peroxide is added and the heating continued for 10 more minutes. The mixture is then cooled, diluted with 3.5 l. of water and the solution extracted 3 times with a total of 1.5 l. of chloroform. The combined extracts are dried over sodium sulfate and evaporated in vacuo to a syrup which crystallizes on cooling and has the odor of acetic acid. This material is dissolved in 500 ml. of hot water (steam bath), and the insoluble oil removed by filtration. The filtrate is cooled slowly. 1-methyl-2-methylsulfonyl-5-nitroimidazole crystallizes. It is separated by filtration and dried M.P. 91–92.5° C.

When the above procedure is carried out with 1-methyl-2-benzylthio-5-nitroimidazole and 1-methyl-2-cyclopentylthio-5-nitroimidazole, there is obtained 1-methyl-2-benzylsulfonyl-5-nitroimidazole, M.P. 164–165° C., and 1-methyl-2-cyclopentylsulfonyl-5-nitroimidazole, M.P. 88–89° C., respectively.

1-ethyl and 1-propyl-2-methylsulfonyl-5-nitroimidazole are obtained by treating 21.8 g. of 1-ethyl-2-methylthio-5-nitroimidazole and 23.4 g. of 1-propyl-2-methylthio-5-nitroimidazole respectively with 35 ml. of 30% hydrogen peroxide by the procedure described above.

EXAMPLE 2

*1-methyl-2-methylsulfonyl-5-nitroimidazole*

A solution of 9.7 g. (0.056 mol.) of 1-methyl-2-methylthio-5-nitroimidazole and 24 g. of 85% m-chloro-perbenzoic acid (0.118 mol.) in 50 ml. of chloroform is allowed to stand at room temperature for one hour. The mixture is then refluxed for 10 minutes, cooled and extracted 3 times with an excess of dilute aqueous sodium bicarbonate. The chloroform solution is separated, dried over sodium sulfate and evaporated in vacuo to leave solid 1-methyl-2-methylsulfonyl-5-nitroimidazole, which crystallizes readily. After one recrystallization from water, substantially pure material is obtained, M.P. 90–92° C.

When the above procedure is carried out using an equimolar quantity of 1-methyl-2-phenylthio-5-nitroimidazole as the starting material, 1-methyl-2-phenylsulfonyl-5-nitroimidazole is obtained.

EXAMPLE 3

*1-($\beta$-acetoxyethyl)-2-methylsulfonyl-5-nitroimidazole*

A solution of 5.0 g. (24.6 mmol.) of 1-($\beta$-hydroxyethyl)-2-methylthio-5-nitroimidazole in 20 ml. of pyridine is mixed with 3.0 ml. of acetic anhydride and the solution allowed to stand for 1 hour at room temperature. The reaction mixture is then poured into 210 ml. of 1.3 N hydrochloric acid and the solution extracted with 3×100 ml. of ether. The ether extracts are combined, dried over sodium sulfate and evaporated to dryness in vacuo. 5.7 g. of crystalline 1-($\beta$-acetoxyethyl)-2-methylthio-5-nitroimidazole is obtained, which is used directly without further purification.

The product is dissolved in 20 ml. of glacial acetic acid and the solution diluted with 20 ml. of water. The mixture is stirred in an ice bath while chlorine is bubbled through it for 35 minutes. Chlorine addition is stopped and the mixture diluted with five volumes of water. The mixture is extracted with three 100 ml. volumes of dichloromethane. The combined extracts are dried over $Na_2SO_4$ and evaporated in vacuo to give 1-($\beta$-acetoxyethyl)-2-methylsulfonyl-5-nitroimidazole as an oil which crystallizes slowly on standing for several hours. Recrystallization of this material from methanol yields colorless crystals of 1-($\beta$-acetoxyethyl)-2-methylsulfonyl-5-nitroimidazole, M.P. 83–87° C. Further recrystallization raises the melting point to 87–89° C.

Following the above-described procedures, 1-($\beta$-hydroxyethyl)-2-methylthio-5-nitroimidazole is acylated with a mixture of propionic acid and propionic anhydride, butyric acid and butyric anhydride, or valeric acid and valeric anhydride to obtain the corresponding 1-(β-acyloxyethyl)-2-methylthio-5-nitroimidazole which is oxidized to produce 1-(β-propionyloxyethyl)-2-methylthio-5-nitroimidazole, 1-(β-butyryloxyethyl)-2-methylthio-5-nitroimidazole, or 1-(β-valeryloxyethyl)-2-methylthio-5-nitroimidazole.

EXAMPLE 4

*1 - (γ - propionoxypropyl) - 2 - methylsulfonyl - 5 - nitroimidazole*

A solution of 24.6 mmol of 1-(γ-hydroxypropyl)-2-methylthio-5-nitroimidazole in 20 ml. of pyridine is mixed with 3.0 ml. of propionic anhydride and the solution allowed to stand for 1 hour at room temperature. The reaction mixture is then poured into 210 ml. of 1.3 N hydrochloric acid and the solution extracted with 3×100 ml. of ether. The ether extracts are combined, dried over sodium sulfate and evaporated to dryness in vacuo. Crystalline 1-(γ-propionoxypropyl)-2-methylthio-5-nitroimidazole is obtained, which is used directly without further purification.

The product is dissolved in 20 ml. of propionic acid and the solution diluted with 20 ml. of water. The mixture is stirred in an ice bath while chlorine is bubbled through it for 35 minutes. Chlorine addition is stopped and the mixture diluted with five volumes of water. The mixture is extracted with three 100 ml. volumes of dichloromethane. The combined extracts are dried over $Na_2SO_4$ and evaporated in vacuo to give 1-(γ-propionoxypropyl)-2-methylsulfonyl-5-nitroimidazole as an oil which crystallizes slowly on standing for several hours. Recrystallization of this material from methanol yields colorless crystals of 1-(γ-proprionoxypropyl)-2-methylsulfonyl - 5 - nitroimidazole.

Following the above procedure, but starting with 1-(β-hydroxypropyl)-2-methylthio-5-nitroimidazole in place of 1 - (γ-hydroxypropyl)-2-methylthio-5-nitroimidazole, 1 - (β - propionoxypropyl) - 2 - methylsulfonyl - 5 - nitroimidazole is obtained.

EXAMPLE 5

*1-methyl-2-methylsulfonyl-5-nitroimidazole*

5.0 g. of powdered 1-methyl-2-methylthio-5-nitroimidazole is suspended in a stirred, cooled (0°) mixture of 30 ml. of glacial acetic acid and 70 ml. of water while a moderate stream of chlorine gas is bubbled through the mixture. The yellow starting material gradually dissolves to leave a colorless solution from which colorless crystals separate on continued treatment. When the starting material is dissolved and the subsequent crystallization is complete, addition of the chlorine gas is stopped and the mixture is filtered to recover the crystals of 1-methyl-2-methylsulfonyl-5-nitroimidazole. The product is washed with water and air dried, M.P. 91–92° C.

Similarly, when 1-ethyl-2-methylthio-5-nitroimidazole, 1-propyl-2-methylthio-5-nitroimidazole, or 1-butyl-2-methylthio-5-nitroimidazole is oxidized by reaction with chlorine in aqueous acetic acid following the above procedure, the corresponding 1-ethyl, 1-propyl or 1-butyl-2-methylsulfonyl-5-nitroimidazole is obtained.

EXAMPLE 6

*1-methyl-2-cyano-5-nitroimidazole*

0.5 gm. of 1-methyl-2-methylsulfonyl-5-nitroimidazole (2.44 mmol.) and 175 mg. of potassium cyanide (2.70 mmol.) are added simultaneously to 2.5 ml. of dimethylformamide. The sulfone dissolves immediately in the stirred solution. The solution becomes slightly warm over one minute, and is heated on a steam bath for an additional minute. The mixture is then cooled, diluted with 40 ml. of water and extracted with 3×40 ml. of ether. After drying and concentration of the combined ether extracts, a brown oil forms which soon crystallizes. This is dissolved in 15–20 ml. of ether and the solution passed through a 4 g. column of acid-washed alumina prepared in ether. The column is further eluted with 100–120 ml. of ether and the combined column effluent and eluates evaporated in vacuo to give pale brown, slightly sticky crystals of 1-methyl-2-cyano-5-nitroimidazole. This substance may be converted without further purification to 1-methyl-5-nitroimidazole-2-carboxamide.

By the same procedure, 1-ethyl-2-cyano-5-nitroimidazole and 1-propyl-2-cyano-5-nitroimidazole are obtained by reacting the corresponding 2-methylsulfonyl compounds with potassium cyanide.

EXAMPLE 7

**A.—*1-(γ-propionoxypropyl)-2-cyano-5-nitroimidazole***

3.54 mmol. of unpurified 1-(γ-propionoxypropyl)-2-methylsulfonyl-5-nitroimidazole and 256 mg. of potassium cyanide (3.9 mmol.) are heated together for 5 minutes with stirring on a steam bath in 5 ml. of dimethylsulfoxide. The reaction mixture is then cooled to room temperature and diluted with 50 ml. of water. The resulting solution is extracted with 3×50 ml. of ether. The ether extracts are combined, dried over sodium sulfate and evaporated in vacuo to an oil. The oily product is dissolved in ether and filtered through 6 g. of acid washed $Si_2O_3$ (Merck). The resulting eluate is evaporated in vacuo to dryness to yield 1-(γ-propionoxypropyl)-2-cyano-5-nitroimidazole as a colorless oil which crystallizes readily on scratching. Recrystallization from ether-hexane gives substantially pure 1-(γ-propionoxypropyl)-2-cyano-5-nitroimidazole.

In accordance with the above procedure, but starting with β-propionoxypropyl-2-methylsulfonyl-5-nitroimidazole in place of 1-(γ-propionoxypropyl)-2-methylsulfonyl-5-nitroimidazole, there is obtained the corresponding 1-(β-propionoxypropyl)-2-cyano-5-nitroimidazole.

In accordance with the above procedure but starting with the corresponding 1-(γ-acetoxypropyl)-, 1-(γ-valeroxypropyl)-, 1-(γ-butyroxypropyl)-2-methylsulfonyl-5-nitroimidazole, in place of 1-(γ-propionoxypropyl)-2-methylsulfonyl-5-nitroimidazole, there is obtained the corresponding 1-(γ-alkanoyloxypropyl)-2-cyano-5-nitroimidazole.

**B.—*1-(γ-hydroxypropyl)-2-cyano-5-nitroimidazole***

A mixture of 1.56 mmol. of 1-(γ-propionoxypropyl)-2-cyano-5-nitroimidazole, 2 ml. of ethanol and 2 ml. of 6 N hydrochloric acid is heated at 100° C. for five minutes. The reaction mixture is cooled to room temperature and diluted with 20 ml. of water. The solution is extracted with 3×20 ml. of ethyl acetate. The combined extracts are dried with sodium sulfate and concentrated to dryness in vacuo. The solid 1-(γ-hydroxypropyl-2-cyano-5-nitroimidazole thus obtained is recrystallized from benzene to give substantially pure material.

In accordance with the above procedure, but starting with 1-(β-propionoxypropyl)-2-cyano-5-nitroimidazole in place of 1-(γ-propionoxypropyl)-2-cyano-5-nitroimidazole, there is obtained the corresponding 1-(β-hydroxypropyl)-2-cyano-5-nitroimidazole.

In accordance with the above procedure but starting with any of the other 1-(γ-alkanoyloxypropyl)-2-cyano-5-nitroimidazoles prepared in accordance with Section A of this example, there is similarly obtained the corresponding 1-(γ-hydroxypropyl)-2-cyano-5-nitroimidazole.

EXAMPLE 8

**A.—*1-(β-acetoxyethyl)-2-cyano-5-nitroimidazole***

0.99 g. (3.54 mmol.) of unpurified 1-(β-acetoxyethyl)-2-methylsulfonyl-5-nitroimidazole and 256 mg. of potassium cyanide (3.9 mmol.) are heated together for 5 minutes with stirring on a steam bath in 5 ml. of dimethylsulfoxide. The reaction mixture is then cooled to room temperature and diluted with 50 ml. of water. The resulting solution is extracted with 3×50 ml. of ether. The ether extracts are combined, dried over sodium sulfate and evaporated in vacuo to an oil. The oily product is dissolved in ether and filtered through 6 g. of acid washed $Sl_2O_3$. The resulting eluate is evaporated in vacuo to dryness to yield 1-($\beta$-acetoxyethyl)-2-cyano-5-nitroimidazole as a colorless oil which crystallizes readily on scratching. Recrystallization from ether-hexane gives substantially pure 1-($\beta$-acetoxyethyl)-2-cyano-5-nitroimidazole, M.P. 55–57° C.

B.—*1-($\beta$-hydroxyethyl)-2-cyano-5-nitroimidazole*

A mixture of 350 mg. of 1-($\beta$-acetoxyethyl)-2-cyano-5-nitroimidazole (1.56 mmol.), 2 ml. of ethanol and 2 ml. of 6 N hydrochloric acid is heated at 100° C. for five minutes. The reaction mixture is cooled to room temperature and diluted with 20 ml. of water. The solution is extracted with 3×20 ml. of ethyl acetate. The combined extracts are dried with sodium sulfate and concentrated to dryness in vacuo. The solid 1-($\beta$-hydroxyethyl)-2-cyano-5-nitroimidazole thus obtained is recrystallized from benzene to give substantially pure material melting at 99.5–101° C.

EXAMPLE 9

*1-methyl-2-cyano-5-nitroimidazole*

1-methyl-2-cyano-5-nitroimidazole is obtained from 1-methyl-2-benzylsulfonyl-5-nitroimidazole, 1-methyl-2-cyclopentylsulfonyl-5-nitroimidazole, 1-methyl-2-phenylsulfonyl-5-nitroimidazole and 1-methyl-2-n-butylsulfonyl-5-nitroimidazole when the sulfones are treated with potassium cyanide according to the procedure of Example 6.

EXAMPLE 10

*1-methyl-5-nitroimidazole-2-carboxamide*

51 mg. (0.335 mmol.) of 1-methyl-2-cyano-5-nitroimidazole is dissolved in 0.5 ml. of acetone followed by 0.20 ml. of water and 0.10 ml. of 2.5 N sodium hydroxide. The mixture is stirred for approximately 1 minute until the second liquid phase which forms redissolves to leave a clear yellow solution. Crystals of 1-methyl-5-nitroimidazole-2-carboxamide then begin to form almost immediately. The mixture is stirred slowly for ten minutes at room temperature and then diluted slowly, with stirring, to a volume of 3 ml. with water. After brief cooling in ice, the 1-methyl-5-nitroimidazole-2-carboxamide is filtered and washed with water and dried, M.P. 215–216° C. It is effective in controlling turkey blackhead disease when administered to turkeys at levels of 0.006–0.0125% by weight in the turkey feed.

When 1-ethyl and 1-propyl-2-cyano-5-nitroimidazole are treated with sodium hydroxide in aqueous acetone by the method described above 1-ethyl-5-nitroimidazole-2-carboxamide and 1-propyl-5-nitroimidazole-2-carboxamide are produced.

EXAMPLE 11

*1-methyl-5-nitroimidazole-2-carboxamide*

A mixture of 205 mg. of 1-methyl-2-methylsulfonyl-5-nitroimidazole (1.00 mmol.), 70 mg. of potassium cyanide (1.09 mmol.) and 2 ml. of water are heated with stirring at 100° C. for 5 minutes. During the heating period rather dark colored crystalline material precipitates. The mixture is then cooled to room temperature and filtered. The crystalline solid thus obtained is 1-methyl-5-nitroimidazole-2-carboxamide.

In accordance with the above procedure, but starting with 1-ethyl-2-methylsulfonyl-5-nitroimidazole or 1-propyl-2-methylsulfonyl-4-nitroimidazole in place of 1-methyl-2-methylsulfonyl-5-nitroimidazole, there is obtained the 1-ethyl-5-nitroimidazol-2-yl carboxamide, and 1-propyl-5-nitroimidazol-2-yl-carboxamide.

EXAMPLE 12

*1-($\beta$-hydroxyethyl)-5-nitroimidazole-2-carboxylic acid $\gamma$-lactone*

3.3 g. (18.1 mmol) of 1-($\beta$-hydroxyethyl)-2-cyano-5-nitroimidazole is dissolved in 22 ml. of warm anhydrous ethanol and the solution treated with 320 mg. of potassium t-butoxide. Almost immediately a copious precipitate of the cyclic iminoether crystallizes out. The suspension is allowed to stand at room temperature for 15 minutes, then treated with 25 ml. of 1.4 N hydrochloric acid (35 mmol). The solid iminoether dissolves and, in a short time, solid 1-($\beta$-hydroxyethyl)-5-nitroimidazole-2-carboxylic acid $\gamma$-lactone is recovered by filtration, M.P. 197–199° C.

144 mg. of 1-($\beta$-hydroxyethyl)-5-nitroimidazole-2-carboxylic acid $\gamma$-lactone is dissolved in 20 ml. of methanol, and the resulting solution is held at 50° C. for 15 minutes while dry ammonia is bubbled into the solution. The solution is then concentrated to dryness in vacuo, and the residue is recrystallized from ethyl acetate to give 1-($\beta$-hydroxyethyl)-5-nitroimidazole-2-carboxamide, M.P. 160–162° C. On recrystallization from acetone, the product melts at 163.5–164.5° C. It is effective against turkey blackhead disease when fed to turkeys at levels of 0.0125% by weight in the feed.

EXAMPLE 13

A.—*Ethyl 1-methyl-5-nitroimidazole-2-carboximidate*

2.00 g. (13.2 mmol) of 1-methyl-2-cyano-5-nitroimidazole is dissolved by warming in 15 ml. of absolute alcohol and to the resulting solution there is added 100 mg. of potassium t-butoxide. After stirring to dissolve the base, the solution is allowed to stand 1½ hours at room temperature. On cooling and scratching, profuse precipitation of ethyl 1-methyl-5-nitroimidazole-2-carboximidate occurs. The resulting mixture is cooled in ice and the solid filtered off and washed twice with cold alcohol. It is dried to give ethyl 1-methyl-5-nitroimidazole-2-carboximidate, M.P. 85–86° C.

B.—*Ethyl 1-methyl-5-nitroimidazole-2-carboxylate*

A solution of 1.0 g. of ethyl 1-methyl-5-nitroimidazole-2-carboximidate in 30 ml. of ethanol is treated with 30 ml. of 1.25 N HCl, and the mixture allowed to stand for 20 minutes at room temperature. The reaction mixture is then diluted with about 150 ml. of water and extracted with three 100 ml. portions of ether. The ether extracts are combined, dried over $Na_2SO_4$ and evaporated to dryness in vacuo to give substantially pure ethyl 1-methyl-5-nitroimidazole-2-carboxylate, M.P. 80–81° C.

This latter material is converted to 1-methyl-5-nitroimidazole-2-carboxamide as follows: 500 mg. of ester is dissolved in 5 ml. of warm 95% ethanol and the solution added with stirring to 8 ml. of cold concentrated ammonium hydroxide. Crystals of 1-methyl-5-nitroimidazole-2-carboxamide form, and the mixture is allowed to stand in the cold until crystallization is complete. The crystals are then removed by filtration and washed with cold water. The product is purified by recrystallization from 95% ethanol to give 1-methyl-5-nitroimidazole-2-carboxamide, M.P. 211–224° C. (dec.). Reaction with aqueous methylamine instead of ammonia gives 1,N'-dimethyl-5-nitroimidazole-2-carboxamide, M.P. 109–110° C. These amides are effective against turkey blackhead disease when fed to turkeys at a dose level of about 0.0125% by weight in the feed.

The starting materials for the process of this invention are prepared in the following manner.

A.—*1-methyl-2-methylthioimidazole*

54.9 g. (0.481 mol) of 1-methyl-2-mercaptoimidazole is added to 400 ml. of methanol followed by 43 ml. of 11.7 N NaOH (0.5 mol). After brief stirring the resulting solution is treated with 69.0 g. (0.485 mol) of methyl iodide, and the reaction flask immersed in an ice bath to avoid loss of methyl iodide due to the heat of the reaction. After about 20 minutes the methanol is removed in vacuo and the residue dissolved in 1 liter of water. The aqueous solution is extracted 3 times with $CH_2Cl_2$ and the combined extracts dried over $Na_2SO_4$. The solvent is removed in vacuo to leave 1-methyl-2-methylthioimidazole as a colorless oil.

Alkylation with benzyl iodide, cyclopentyl iodide and n-butyl iodide by this procedure affords 1-methyl-2-benzylthioimidazole, 1-methyl-2-cyclopentylthioimidazole and 1-methyl-2-n-butylthioimidazole, respectively. Treatment of other 1-loweralkyl-2-mercaptoimidazoles such as 1-ethyl or 1-propyl-2-mercaptoimidazole with methyl iodide or any of the previously mentioned iodides yields the corresponding 1-loweralkyl-2-methylthioimidazole or the thioimidazole corresponding to the alkylating agent employed.

B.—1-methyl-2-methylthio-5-nitroimidazole 60.4 g. (0.472 mol) of 1-methyl-2-methylthioimidazole is dissolved in a mixture of 440 ml. of concentrated nitric acid and 180 ml. of water. The solution is heated on the steam bath for 40 minutes. The mixture is then cooled, diluted with 6 l. of water and the yellow solution extracted 4 times with a total of 3 liters of chloroform. The combined extracts are dried and evaporated in vacuo to give yellow crystals of 1-methyl-2-methylthio-5-nitroimidazole.

The crude product is purified by filtration through alumina. A solution of the crude in 1 liter of ether is diluted with hexane until heavy cloudiness occurs and the resulting preparation filtered through 380 g. of basic alumina prepared in 1:1 hexane-ether.

The column is eluted with a further 3 l. of 1:1 hexane-ether and the combined eluates concentrated until crystallization begins. The mixture is then cooled in ice and the bright yellow crystals of 1-methyl-2-methylthio-5-nitroimidazole, recovered by filtration, M.P. 86–88° C.

When the above reaction is carried out using as starting material 1-methyl-2-benzylthioimidazole, 1-methyl-2-cyclopentylthioimidazole and 1 - methyl - 2-n-butylthioimidazole, there is obtained 1-methyl-2-benzylthio-5-nitroimidazole, M.P. 100–101° C.; 1-methyl-2-cyclopentylthio-5-nitroimidazole, M.P. 48–48.5° C.; and 1-methyl - 2-n-butyl-thio-5-nitroimidazole, (an oil) respecsively. Nitration of other 1-loweralkyl compounds such as 1-ethyl or 1-propyl-2-substituted thioimidazole by this process affords the corresponding 5-nitroimidazole.

C.—1-methyl-2-phenylthio-5-nitroimidazole

A mixture of 1.14 g. (10 mmol.) of 1-methyl-2-mercaptoimidazole, 4.0 ml. of 2.5 N sodium hydroxide (10 mmol.), 4.1 g. of diphenyliodonium iodide (10 mmol.) and 25 ml. of ethanol is refluxed for 90 minutes. The reaction mixture is then cooled and diluted with about 250 ml. of water. It is extracted with 3×100 ml. of chloroform. The chloroform extracts are combined, dried and finally evaporated in vacuo to dryness, 555 mg. of impure 1-methyl-2-phenylthioimidazole is obtained. This product is nitrated by heating for 45 minutes in a mixture of 1.5 ml. of water and 4.0 ml. of concentrated nitric acid at 100° C. The reaction mixture is then cooled to room temperature, diluted with 50 ml. of water and extracted with three 50 ml. portions of $CHCl_3$. The chloroform extracts are combined and dried over $NaSO_4$. The combined extract is evaporated in vacuo to dryness. A yellow oil is obtained which crystallizes almost immediately. These crystals are recrystallized from ethyl acetate to give 1-methyl-2-phenylthio-5-nitroimidazole as yellow crystals, M.P. 139.5–142.5° C. Further recrystallization raises the M.P. to 145–146° C.

D.—1-(β-hydroxyethyl)-2-methylthio-5-nitromidazole

To a mixture of 2.00 g. of 1-(β-hydroxyethyl)-2-mercaptoimidazole (13.9 mmol.) and 6.0 ml. of 2.5 N NaOH (15 mmol.) in 20 ml. of methanol there is added 0.90 ml. (2.05 g., 14.5 mmol.) of methyl iodide. After 5 minutes, the methanol is evaporated in vacuo and the residue dissolved in 20 ml. of water. The resulting aqueous solution is extracted with five 10 ml. portions of ethyl acetate. The ethyl acetate extracts are combined, dried over sodium sulfate and evaporated in vacuo to dryness to give 1.74 g. of 1-(β-hydroxyethyl)-2-methylthioimidazole.

The 1-(β-hydroxyethyl) - 2 - methylthioimidazole thus obtained is dissolved in a mixture of 4.1 ml. water and 10 ml. of concentrated nitric acid and the solution heated about 5 minutes on the steam bath. The reaction mixture is then cooled to room temperature and diluted with 120 ml. of water. It is extracted with five 100 ml. portions of ethyl acetate. The combined ethyl acetate extracts are dried over $Na_2SO_4$ and evaporated in vacuo to dryness to a yellow glass. An ethyl acetate solution of this material is filtered through a 10 g. column of basic alumina (Merck), and the filtrate concentrated until crystallization begins. The crystalline 1-(β-hydroxyethyl)-2-methylthio-5-nitroimidazole thus obtained is recrystallized from ethylacetate to give material melting at 103–106° C.

Following these same procedures other 1-hydroxylower alkyl compounds such as 1-(γ-hydroxypropyl) and 1-(β-hydroxypropyl)-2-mercaptoimidazoles are converted to the corresponding 1-hydroxyloweralkyl-2-methylthio - 5-nitroimidazoles.

EXAMPLE 14

1-phenyl-2-mercaptoimidazole 64.9 g. of 1,1-diethoxy-2-amino ethane is added to 64.0 grams of phenylisothiocyanate, with stirring. The temperature of the reaction mixture reaches about 90° C. very quickly and then subsides slowly after about 15 minutes. To the warm reaction mixture is added 400 ml. of water and then 240 ml. of concentrated sulfuric acid. The reaction mixture is allowed to stand overnight and then heated for about two hours on the steam bath. It is then cooled and diluted with water to about 1.5 liters, which causes precipitation of the crystalline 1-phenyl-2-mercaptoimidazole. The product is recovered by filtration and melts at 179–182° C.

EXAMPLE 15

1-phenyl-2-methylthio-5-nitroimidazole 19.0 g. of 1-phenyl-2-mercaptoimidazole is dissolved in a mixture of 50 ml. of water and 44 ml. of 2.5 N sodium hydroxide. The mixture is filtered and treated with 14.0 grams of dimethyl sulfate. The resulting mixture is agitated vigorously for about 10 minutes and then cooled and extracted twice with ether. The ether extracts are dried over sodium sulfate and evaporated to leave a syrupy residue containing 1-phenyl - 2 - methylthioimidazole.

The methylated product is treated with 80 ml. of water and then 195 ml. of concentrated nitric acid; the reaction mixture being heated on a steam bath to a temperature of 90–95° C. The resulting reaction mixture is cooled by the addition of ice to about 15° C. and then 120 ml. of 11.7 N sodium hydroxide is added along with additional ice to keep the temperature below about 35° C. The 1-phenyl-2-methylthio-5-nitroimidazole precipitates in the form of a gummy, partly crystalline product. The product is extracted from the reaction mixture with a total of about 900 ml. of chloroform. The combined extracts are dried over sodium sulfate and evaporated to dryness. The resulting residue is extracted three times with 500 ml. of hot ether and the combined extracts passed over a column containing 200 g. of basic alumina. The alumina column is then eluted with ether until about 1.5 liters of eluate are obtained. The ether eluate is evaporated to a volume of about 50-75 ml. and allowed to stand for two days. The concentrate is then cooled in ice to precipitate 1-phenyl-2-methylthio-5-nitroimidazole in the form of yellow crystals, melting at 115-117° C.

EXAMPLE 16

*1-phenyl-2-methylsulfonyl-5-nitroimidazole*

3.21 g. of 1-phenyl-2-methylthio-5-nitroimidazole is suspended in a mixture of 10 ml. of glacial acetic acid and 20 ml. of water and treated with gaseous chlorine until the color is dissipated for 15 minutes. The resulting reaction mixture is diluted with 15 ml. of water, cooled in ice, and the resulting white crystalline precipitate of 1-phenyl-2-methylsulfonyl-5-nitroimidazole is recovered by filtration and after washing with water and drying, melts at about 120-140° C. Recrystallization from methanol yields a crystalline product melting at 150-152.5° C.

EXAMPLE 17

*1-phenyl-2-cyano-5-nitroimidazole*

A mixture of 2.3 g. of 1-phenyl-2-methylsulfonyl-5-nitroimidazole and 663 mg. of potassium cyanide are heated together on the steam bath for four minutes with hand-stirring in 13 ml. of dimethyl sulfoxide. The resulting reaction mixture is cooled, diluted with 100 ml. of water and then extracted three times with ether; the combined extracts being dried over sodium sulfate. The filtered ether extracts are passed through a column containing 100 g. of acid-washed alumina and the column eluted with ether. About 350 ml. of the eluate is evaporated to obtain 1-phenyl-2-cyano-5-nitroimidazole in the form of yellow crystals, melting at about 199.5-200.5° C.

EXAMPLE 18

*1-phenyl-5-nitroimidazole-2-carboxamide*

1.03 g. of 1-phenyl-2-cyano-5-nitroimidazole is dissolved in 12 ml. of acetone and 4 ml. of water added. To this solution is added 1.0 ml. of 2.5 N sodium hydroxide and the solution agitated to bring the phases together. The reaction mixture is allowed to stand for one-half hour, diluted slowly with 50 ml. of water, cooled in ice and the resulting precipitated product recovered by filtration. The 1-phenyl-5-nitroimidazole -2-carboxamide melts at 120-170° C. and after recrystallization from ethanol, is found to melt at 199-200° C.

Any departure from the above description which conforms to the present invention is intended to be included within the scope of the claims.

I claim:

1. A compound having the formula:

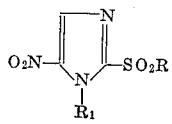

where $R_1$ represents a member of the class consisting of phenyl, and $-(CH_2)_nOX$, R is a member of the class consisting of an alkyl group of from 1-5 carbon atoms, phenyl and benzyl, $n$ has a value of 2-4, and X is selected from the class consisting of hydrogen and lower alkanoyl.

2. A compound of claim 1 which is 1-($\beta$-acetoxyethyl)-2-methylsulfonyl-5-nitroimidazole.

3. A compound of claim 1 which is 1-($\gamma$-acetoxypropyl)-2-methylsulfonyl-5-nitroimidazole.

4. A compound of claim 1 which is 1-phenyl-2-methylsulfonyl-5-nitroimidazole.

5. A compound of the formula:

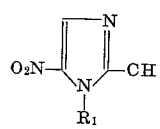

where $R_1$ represents a member of the class consisting of phenyl and $-(CH_2)_nOX$, $n$ has a value of 2-4, and X is selected from the class consisting of hydrogen and lower alkanoyl.

6. A compound of claim 5 which is 1-($\beta$-hydroxyethyl)-2-cyano-5-nitroimidazole.

7. A compound of claim 5 which is 1-($\gamma$-hydroxypropyl)-2-cyano-5-nitroimidazole.

8. A compound of claim 5 which is 1-phenyl-2-cyano-5-nitroimidazole.

9. The process for preparing a 2-cyano-5-nitroimidazole of the formula:

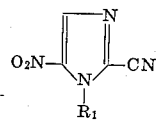

that comprises intimately contacting a compound of the formula:

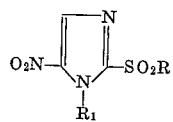

with cyanide ion in a non-aqueous reaction medium, where R is selected from the class consisting of an alkyl group of 1-5 carbon atoms, phenyl and benzyl, and $R_1$ is selected from the class consisting of loweralkyl, phenyl, and $-(CH_2)_nOX$, $n$ has a value of 2-4, and X is lower alkanoyl.

10. The process of claim 9 for making 1-methyl-2-cyano-5-nitroimidazole that comprises contacting 1-methyl-2-methylsulfonyl-5-nitroimidazole with cyanide ion in a non-aqueous reaction medium.

11. The process of claim 9 for preparing 1-loweralkyl-5-nitroimidazole-2-carboxamide that comprises contacting 1-loweralkyl-2-R sulfonyl-5-nitroimidazole with cyanide ion in an aqueous reaction medium, where R is selected from the class consisting of an alkyl group of from 1-5 carbon atoms, phenyl and benzyl.

References Cited

UNITED STATES PATENTS

| | | | |
|---|---|---|---|
| 2,471,518 | 5/1949 | Dusel et al. | 260—558 |
| 2,919,277 | 12/1959 | Berther | 260—558 |
| 2,974,087 | 3/1961 | Rogers | 167—53.1 |
| 3,187,006 | 6/1965 | Druey et al. | 260—310 |

OTHER REFERENCES

Bennett et al.: Jour. Amer. Chem. Soc., vol. 79, pp. 2188-91 (1957). Pyman et al: Jour. Chem. Soc. (London), vol. 123, p. 496 relied on (1923).

JOHN D. RANDOLPH, *Primary Examiner.*

WALTER A. MODANCE, *Examiner.*

N. TROUSOF, *Assistant Examiner.*